United States Patent
Sheehan et al.

(10) Patent No.: US 6,640,404 B2
(45) Date of Patent: Nov. 4, 2003

(54) THREE PIECE COUPLING ARRANGEMENT FOR A TURRET INDEXING MECHANISM FOR A MACHINE TOOL ASSEMBLY AND AN AIR BEARING ASSEMBLY FOR THE SAME

(75) Inventors: Terrence Sheehan, Elmira, NY (US); Brian C. Sheehan, Elmira, NY (US); Gary L. Comstock, Gillett, PA (US)

(73) Assignee: Hardinge Inc., Elmira, NY (US)

( * ) Notice: Subject to any disclaimer, the term of this patent is extended or adjusted under 35 U.S.C. 154(b) by 0 days.

(21) Appl. No.: 09/939,795

(22) Filed: Aug. 28, 2001

(65) Prior Publication Data

US 2002/0032107 A1 Mar. 14, 2002

Related U.S. Application Data

(60) Provisional application No. 60/228,454, filed on Aug. 29, 2000, and provisional application No. 60/228,116, filed on Aug. 28, 2000.

(51) Int. Cl.[7] ............................................. B23B 29/32
(52) U.S. Cl. ..................... 29/40; 29/48.5 A; 74/813 L
(58) Field of Search ............................. 29/40, 39, 42, 29/48.5 R, 48.5 A, 813 C, 821; 74/813 R, 813 L, 813 C, 821; 483/15; 192/69.8, 69, 66.1; 82/120, 121, 159; 408/35

(56) References Cited

U.S. PATENT DOCUMENTS

| 3,686,979 A | * | 8/1972 | Petri et al. ............... 74/813 C |
| 3,782,226 A | * | 1/1974 | Boyd et al. ................. 74/821 |
| 3,877,323 A | | 4/1975 | Vetsch |
| 3,979,819 A | * | 9/1976 | Nomura et al. ............. 483/39 |
| 3,999,264 A | * | 12/1976 | Carmen ................... 29/48.5 R |
| 4,597,155 A | * | 7/1986 | Garnett et al. ............. 29/564 |
| 4,785,513 A | * | 11/1988 | Lee et al. ..................... 29/40 |
| 4,794,686 A | * | 1/1989 | Moore ......................... 483/15 |
| 4,989,303 A | | 2/1991 | Sauter et al. |
| 4,991,474 A | * | 2/1991 | Thumm et al. ............. 82/159 |
| 5,168,614 A | | 12/1992 | Thumm |
| 5,178,040 A | | 1/1993 | Schmidt |
| 5,187,847 A | | 2/1993 | Thumm et al. |
| 5,271,134 A | | 12/1993 | Schips |
| 5,386,743 A | | 2/1995 | Su et al. |
| 5,632,075 A | | 5/1997 | De Bernardi et al. |
| 5,657,523 A | | 8/1997 | Lin et al. |

FOREIGN PATENT DOCUMENTS

| EP | 0 214 090 | | 3/1987 |
| EP | 0455286 A2 | * | 7/1996 |
| JP | 408057800 A | * | 3/1996 |

* cited by examiner

Primary Examiner—A. L. Wellington
Assistant Examiner—Erica E Cadugan
(74) Attorney, Agent, or Firm—Pillsbury Winthrop LLP; Intellectual Property Group (57) ABSTRACT

The present invention is directed to an indexing tool turret assembly and method for operating the same. The indexing tool turret assembly includes a tool turret assembly rotatably supported on the machine tool, an indexing assembly for selectively rotating the tool turret assembly to a desired location. The indexing assembly includes a locking assembly to prevent rotation of the tool turret assembly during operation of either a stationary tool assembly or live tool assembly located on the tool turret assembly. A cushioning bearing assembly is provided for selectively separating the tool turret assembly from the locking mechanism during an indexing operation. The cushioning bearing assembly provides a slight lift to separate the tool turret assembly from the locking mechanism to reduce friction and other potential damages forces between these components.

11 Claims, 11 Drawing Sheets

THREE PIECE COUPLING ARRANGEMENT FOR A TURRET INDEXING MECHANISM FOR A MACHINE TOOL ASSEMBLY AND AN AIR BEARING ASSEMBLY FOR THE SAME

The present application claims priority to U.S. Provisional Applications of Terrence Sheehan, Application Ser. No. 60/228,116, filed Aug. 28, 2000 and Ser. No. 60/228,454, filed Aug. 29, 2000, the entirety of which are incorporated into the present application by reference.

FIELD OF THE INVENTION

The present invention relates to an indexing tool turret for a machine tool. In particular, the present invention relates to an improved three piece coupling arrangement for a turret indexing mechanism that permits rotation of a tool turret during an indexing operation and prevents rotation of the tool turret during a machining operation. An air bearing is provided to reduce friction between the tool turret and the indexing mechanism during the indexing operation.

BACKGROUND OF THE INVENTION

Machine tools with indexing tools turrets have found widespread use in the machine tool industry. The indexing tools turrets permit a single machine tool to perform drilling, turning, milling, boring, etc. on a workpiece by selectively indexing the tools located on the tool turret. One such type of indexing tool turret is disclosed in U.S. Provisional Patent Application No. 60/099,295, entitled "Indexing Tool Turret" and U.S. patent application Ser. No. 09/389,051, entitled "Indexing Tool Turret." Both applications are assigned to the same assignee as the present application, and are specifically incorporated herein by reference.

A positioning mechanism is needed to selectively index the tool turret to a desired orientation to perform a desired machining operation. Many of the prior art positioning mechanisms are not suitable for high speed indexing and/or high precision indexing. These mechanisms provide for the axial movement of the tool turret during the indexing operation. The tool turrets are quite heavy. The axial movement of these heavy tool turrets during the indexing operation generates an inertia that can adversely impact the precise alignment of the tool turret, which is necessary for today's high precision products. Furthermore, this axial movement of the tool turret increases the overall indexing time.

There is a need for a positioning mechanism for selectively indexing a tool turret that does not require substantial axial movement of the tool turret. Others have attempted to develop positioning mechanisms for indexing a tool turret with this objective in mind. Indexing mechanisms are disclosed in U.S. Pat. No. 5,271,134 to Schips, entitled "Tool Turret With Axial Reactive Force," U.S. Pat. No. 5,632,075 to De Bernardi et al., entitled "Tool-Carrier Turret" and U.S. Pat. No. 5,657,523 to Lin et al., entitled "Positioning Mechanism of Turret Index." These indexing mechanisms have rather complex constructions. Furthermore, there is contact between the locking mechanism and the tool turret during the indexing operation. The tool turret and the indexing mechanism are further subject to increased torsional resistance and increased friction. Over time, this can result in damage to the tool turret and the indexing mechanism, which leads to increased maintenance costs and increased down time of the machine tool for repair. These devices also lack accurate control of the axial movement of the turret during the machining operation, which can create bending or lifting forces on the turret. These forces can adversely impact the machining of the workpiece.

OBJECTS OF THE INVENTION

It is an object of the present invention to provide a three piece coupling arrangement for an indexing mechanism for a machine tool that eliminates the problems identified in the above-identified prior art.

It is another object of the present invention to provide a machine tool having an improved turret indexing mechanism for selectively indexing the tool turret to a desired position so that a live tool or a stationary tool may perform a machining operation on a workpiece.

It is another object of the present invention to provide an improved turret indexing mechanism having a three piece coupling assembly for selectively engaging the tool turret during a machining operation to prevent rotation of tool turret.

It is another object of the present invention to provide an improved turret indexing mechanism having a three piece coupling assembly for selectively disengaging the tool turret to allow the rotation of the tool turret to a desired position during a turret indexing operation.

It is another object of the present invention to provide an assembly that reduces friction between the three piece coupling arrangement and the tool turret during an indexing operation.

It is another object of the present invention to provide a selectively operable bearing assembly that reduces friction between the three piece coupling arrangement and the tool turret during an indexing operation.

It is another object of the present invention to provide a selectively operable bearing assembly that utilizes air to reduce friction between the three piece coupling arrangement and the tool turret during an indexing operation.

It is another object of the present invention is to provide an improved turret indexing mechanism that can accomplish the above-identified objects with a simple and compact construction.

It is another object of the present invention to provide an indexing mechanism for a machine tool that can change live and/or stationary tools at high speed.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification.

SUMMARY OF THE INVENTION

In response to the foregoing challenges, applicants have developed an innovative indexing tool turret assembly for a machine tool, whereby the tool turret assembly can be quickly and smoothly indexed to a new location. The indexing tool turret assembly includes a tool turret assembly rotatably supported on the machine tool, and an indexing assembly for selectively rotating the tool turret assembly to a desired location. The indexing assembly includes a locking assembly to prevent rotation of the tool turret assembly during operation of either a stationary tool assembly or live tool assembly located on the tool turret assembly.

In accordance with the present invention, a cushioning bearing assembly is provided for selectively separating the tool turret assembly from the locking mechanism during an indexing operation. The cushioning bearing assembly provides a slight lift to separate the tool turret assembly from the locking mechanism to reduce friction and other potential damaging forces between these components. It is contemplated that the cushioning bearing assembly includes a supply of air that selectively separates the tool turret assembly from the locking assembly.

In accordance with the present invention, the locking assembly includes a rotatable coupling member connected to the tool turret assembly, a fixed coupling member, and a locking mechanism for selectively locking the rotatable coupling member to the fixed coupling member. The rotatable coupling member is selectively rotatable with respect to the fixed coupling member. The locking mechanism locks the rotatable coupling member to the fixed coupling member during a machining operation. It is contemplated that the supply of air of the cushioning bearing assembly is provided to separate the tool turret assembly from the fixed coupling member.

The locking mechanism includes a movable coupling member adapted to selectively engage the fixed coupling member and the rotatable coupling member. The locking mechanism further includes an actuator assembly for selectively moving the movable coupling member into engagement with the fixed and rotatable coupling members.

The present invention is also directed to a method of indexing a rotatable tool turret assembly of a machine tool. The method in accordance with the present invention includes providing an indexing assembly for selectively rotating a tool turret assembly to a desired location. The indexing assembly includes a locking assembly to prevent rotation of the tool turret assembly during the machining operation. The method further includes separating the tool turret assembly from the locking assembly by providing a supply of air to selectively separate the tool turret assembly from the locking assembly. The supply of air forms a cushion of air between the tool turret assembly and the locking assembly. The method further includes rotating the tool turret to the desired location. After rotation, the supply of air is terminated and the locking assembly is operated to prevent rotation of the tool turret assembly.

BRIEF DESCRIPTION OF THE DRAWINGS

The invention will be described in conjunction with the following drawings in which like reference numerals designate like elements and wherein.

DETAILED DESCRIPTION OF THE PREFERRED EMBODIMENT

Figure 1:
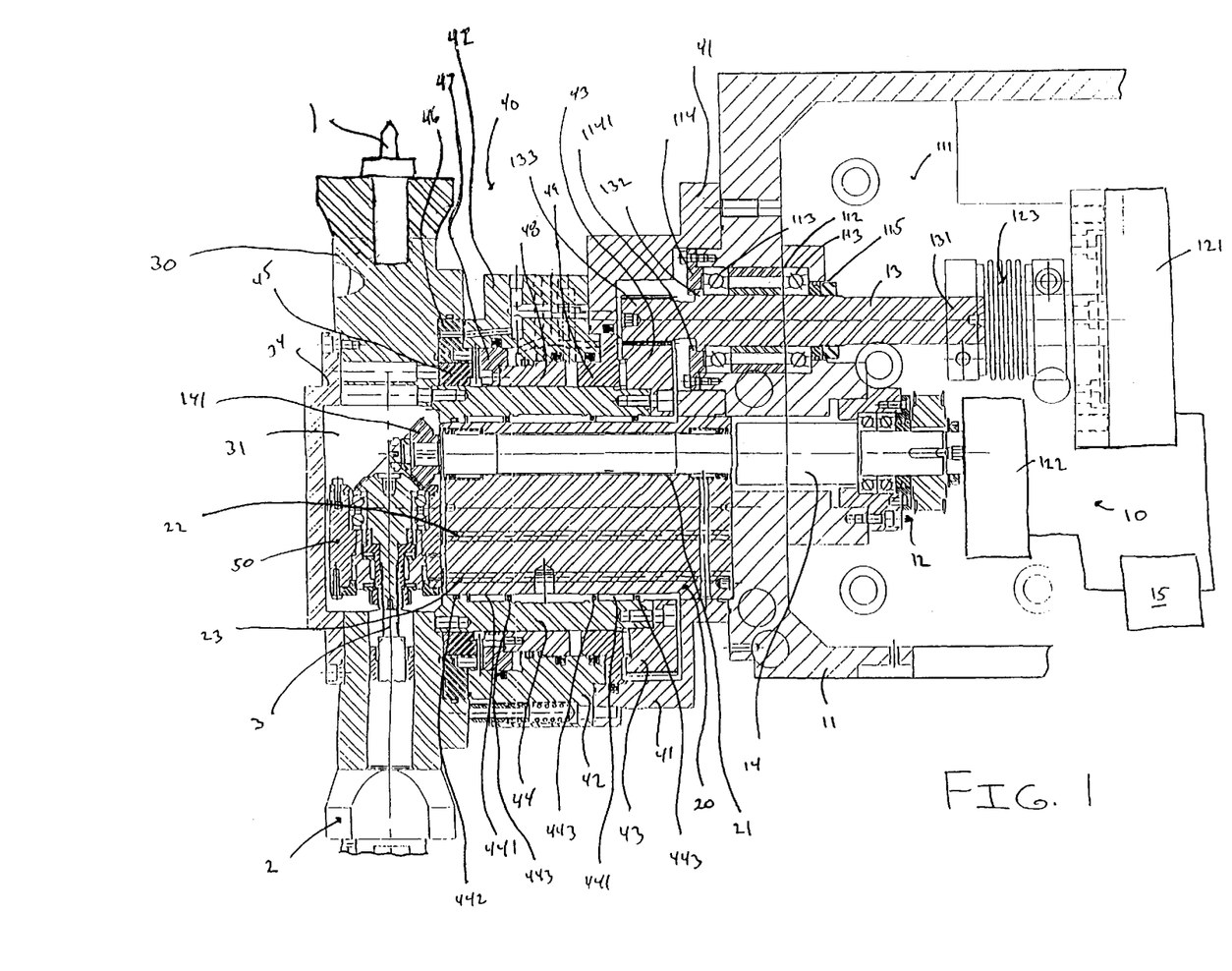
FIG. 1 is a cross sectional view of a machine tool having a turret indexing system according to the present invention.

A machine tool 10 is illustrated in FIG. 1. The machine tool 10 may be a lathe or other work center that is capable of performing multiple machining operations on a workpiece including but not limited to milling, turning, drilling, boring, etc. Furthermore, it is contemplated that the machine tool 10 will include stationary tools 1 and/or live tools 2. Various combinations of live tools 2 and stationary tools 1 are considered to be well within the scope of the present invention. The machine tool 10 includes a housing 11 having a hollow interior 111. Located within the hollow interior 111 is one or more power supplies 121 and 122, which supply power to selectively index a tool turret 30 to a desired location and drive a live tool 2 on the tool turret 30 to perform a desired machining. The turret power supply 121 provides a means for selectively rotating a turret indexing shaft 13. The tool power supply 122 provides a means for selectively rotating a live tool drive shaft 14. It is contemplated by the applicants that separate power supplies 121 and 122, as shown in FIG. 1, may be provided to separately drive the turret indexing shaft 13 and the live tool drive shaft 14. The present invention, however, is not limited to a pair of power supplies; rather, it is contemplated that a single power supply may be provided to selectively drive both shafts 13 and 14.

The power supplies 121 and 122 are operatively connected to a control assembly 15 for controlling the operation of the power supplies 121 and 122. The control assembly 15 may operate the power supply 121 to rotate the turret indexing drive shaft 13 to perform a tool indexing operation. The control assembly 15 may further deactivate the power supply 121 to stop rotation of the tool indexing drive shaft 13. The control assembly 15 may then operate the power supply 122 to operate the live tool drive shaft 14 to perform a desired machining operation.

The control assembly 15 is also connected to valve actuation assemblies on air and hydraulic supplies 81, 82 and 83 to control the operation of both hydraulic and pneumatic assemblies for the turret indexing mechanism, described in greater detail below. The control assembly 15 provides computer control for maintaining the operation of the machine tool, and the turret indexing mechanism.

In the event that a single power supply is employed, the control assembly 15, for example, may control the power supply to alternatively supply power to rotate the tool indexing drive shaft 13 to rotate the tool turret 30 to a desired orientation or to supply power to rotate the live tool drive shaft 14 to operate a live tool 2.

In either event, in the preferred embodiment, the control assembly 15 controls the supply of power such that only one of the turret indexing shaft 13 and the live tool drive shaft 14 is operational at a given time. This prevents simultaneous indexing of the tool turret 30 and driving of the live tool 2 located on the tool turret 30, which may result in damage to the machine tool, misalignment of the tool turret and/or damage to the machined workpiece. Furthermore, the control assembly 15 terminates the supply of power to the live tool drive shaft 14 when a desired machining operation is complete. The control assembly 15 may then operate the power supply to supply power to the turret indexing shaft 13 to index the tool turret 30 to a new orientation so that a subsequent machining operation may be performed by either a live tool or a stationary tool on the tool turret 30. The operation of the machine tool 10 will be described in greater detail below.

Figure 4:
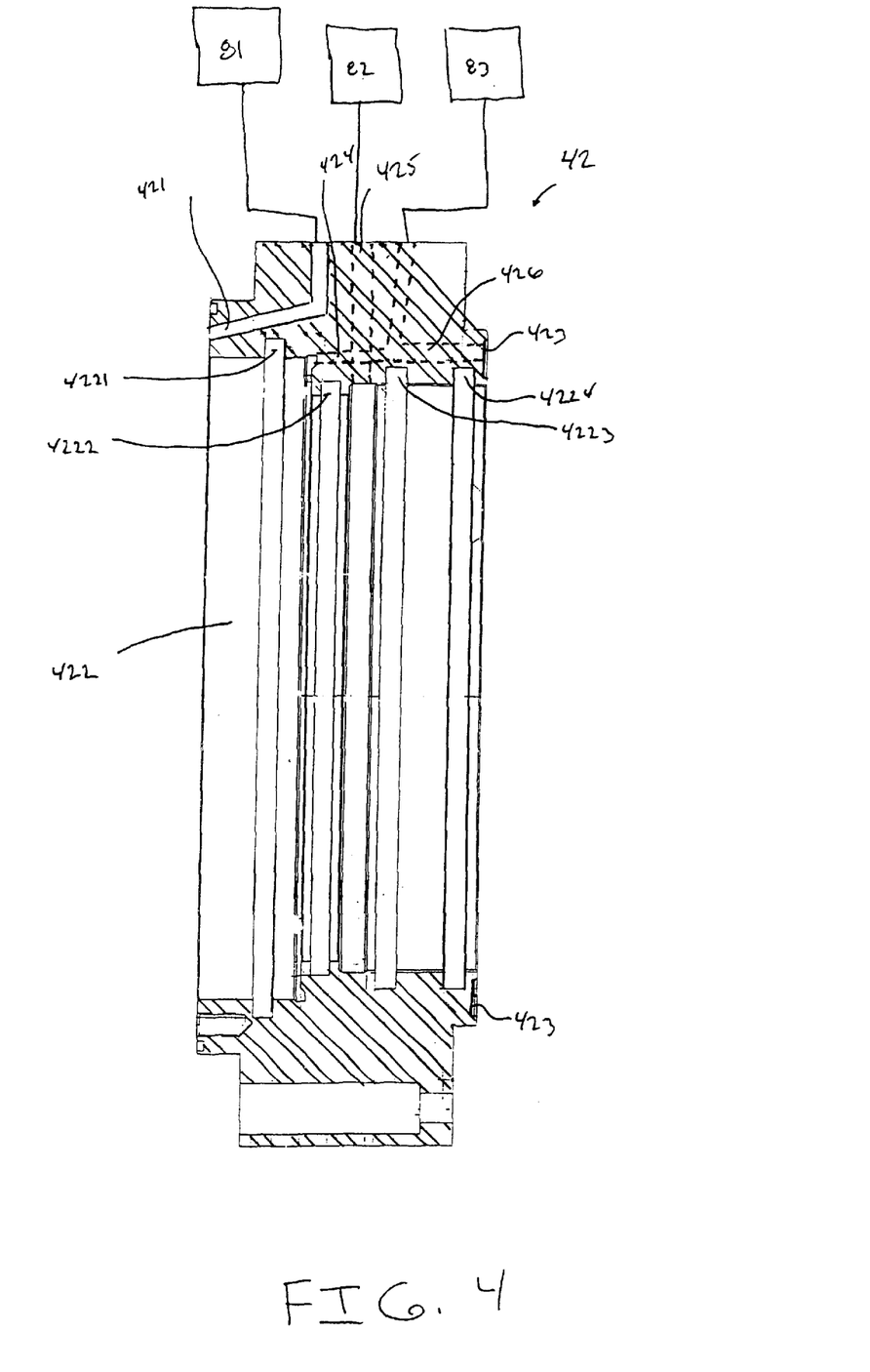
FIG. 4 is an enlarged cross sectional view of a coupling member housing of the turret indexing assembly in accordance with the present invention.

One end 131 of the turret indexing shaft 13 is secured to a connection assembly 123 for operatively coupling the turret indexing shaft 13 to the power supply 121. The turret indexing shaft 13 extends through a cavity 112 in the housing 11. At least one bearing assembly 113 is located within the cavity 112 and surrounds the turret indexing shaft 13, as shown in FIG. 4. A mounting plate 114 is secured to the housing 11 using appropriate fasteners. The mounting plate 114 covers at least a portion of the cavity 112. The mounting plate 114 is adapted to contact the bearing assembly 113 to secure the bearing assembly 113 within the cavity 112.

The turret indexing shaft 13 includes a rib 132 that is adapted to be received within a recess created by a portion of the bearing assembly 113 and a rib portion 1141 of the mounting plate 114, as shown in FIG. 4. The rib 132 in connection with the recess prevent axial movement of the turret indexing shaft 13. This arrangement also prevents contaminants from entering the cavity 112. Additionally, a fastening assembly 115 is located adjacent the cavity 112 to lock the bearing assembly 113. The fastening assembly 115 and the bearing assembly 113 keep contaminants from entering the housing 11 through the cavity 112.

A gear end 133 of the turret indexing shaft 13 terminates within an indexing housing 41 of an indexing assembly 40. The indexing assembly 40 further includes a coupling member housing 42, which is secured to the first indexing housing 41. The gear end 133 of the turret indexing shaft 13 mates with an indexing gear 43 located within the indexing housing 41. The indexing assembly 40 will be described in greater detail below.

The live tool drive shaft 14 extends through a passageway 21 within a hub 20 that is secured to the housing 11. Bearing assemblies and/or a suitable lubricant may be provided within the passageway 21 to ensure smooth rotation of the drive shaft 14 and axial movement of the same when necessary. Passageways 22 and 23 are provided in the hub 20 for operating a retractable linking mechanism 50 located within a cavity 31 in the tool turret 30. The retractable linking mechanism 50 operatively couples the live tool drive shaft 14 to the live tool 2 to drive the live tool 2 to perform a machining operation. The passageways 22 and 23 provide a supply of air or hydraulic fluid to operate the retractable linking mechanism 50 to either engage or disengage the live tool 2. The retractable linking mechanism 50 is disengaged from the live tool 2 to perform a turret indexing operation. Additionally, the retractable linking mechanism 50 may be disengaged from the live tool 2 when a machining operation is terminated.

Figure 10:
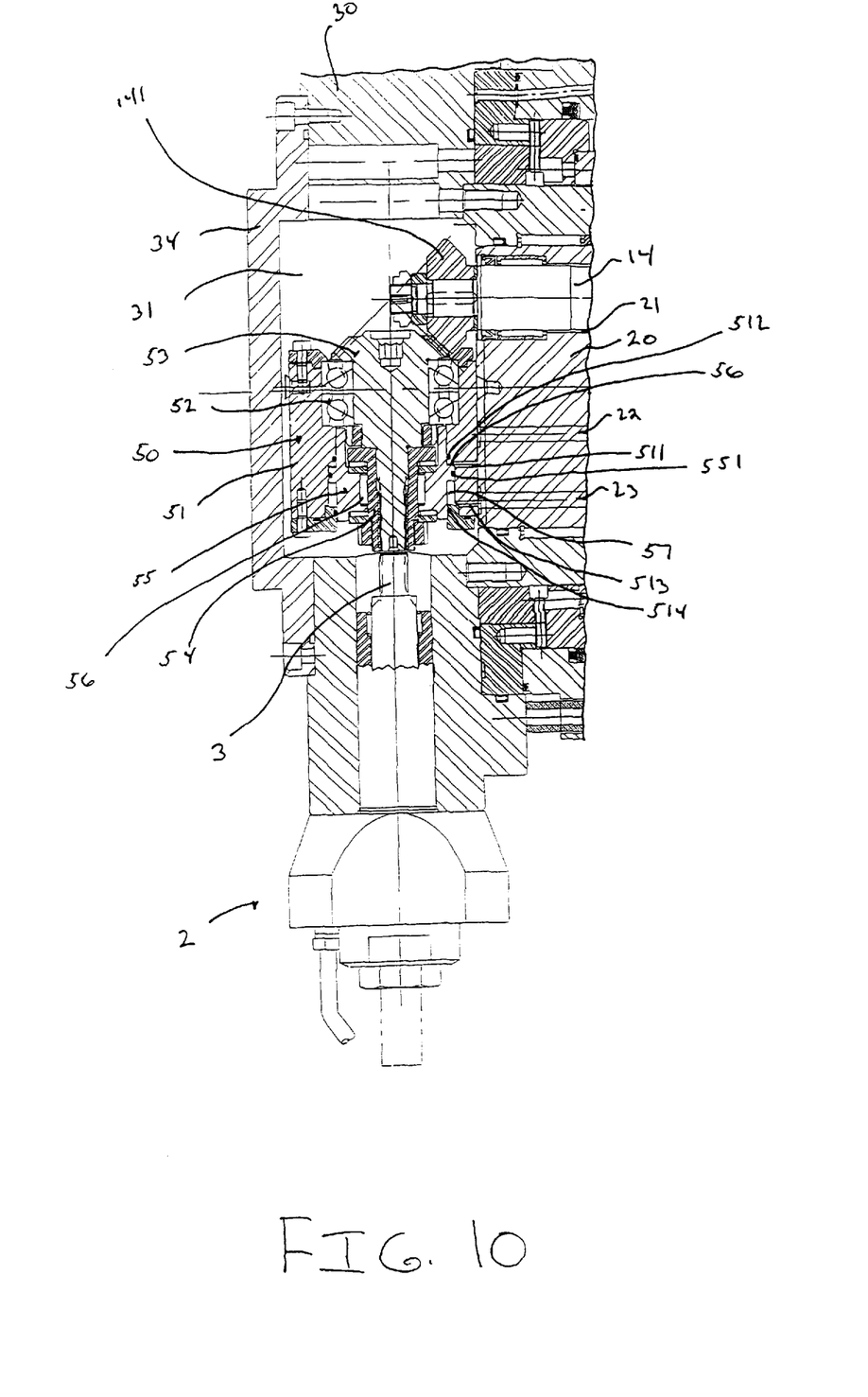
FIG. 10 is an enlarged view of a retraction mechanism for operating a live tool in accordance with the present invention.

As shown in FIG. 10, the retractable linking mechanism 50 includes a housing 51 located within the cavity 31. The housing 51 is secured to the hub 20. Rotatably supported in the housing 50 by a suitable bearing assembly 52 is a bevel gear 53. The bevel gear 53 is operatively coupled to the bevel gear 141. The gears 53 and 141 remain operatively coupled together. A retraction coupling assembly 54 surrounds an opposite end of the bevel gear 53. The retraction coupling assembly 54 is rotatably supported in a movable housing 55 by a suitable bearing assembly 56.

The engaging operation of the retractable linking mechanism 50 will now be described, wherein the live tool 2 is operatively linked to the live tool drive shaft 14. A supply of air or hydraulic fluid is provided through passageway 22, which terminates at the housing 51. This operation is controlled by the control assembly 15. The passageway 22 is linked to passageway 511 in the housing 51. The passageway 511 extends through the housing 51, as shown in FIG. 10. The air or fluid travels through the passageways 22 and 511 to an extension cavity 56 between the housing 51 and the movable housing 55. Seals 512 and 551 are provided on the housings 51 and 55 to seal the void to prevent the escape of air/fluid. As the air/fluid enters the extension cavity 56, the movable housing 55 and the attached retraction coupling assembly 54 are moved toward and engage an extension 3 on the live tool 2. When the retraction coupling assembly 54 is in an extended position, the live tool 2 is operatively coupled to the live tool drive shaft 14, whereby rotation of the drive shaft 14 operates the live tool 2 to perform a desired machining operation. The supply of air/fluid is sufficient such that the retraction coupling assembly 54 remains operatively connected to the extension 3 of the live tool 2.

The disengaging operation of the retractable linking mechanism 50 will now be described, wherein operative link between the live tool 2 and the live tool drive shaft 14 is temporarily terminated. A supply of air or hydraulic fluid is provided through passageway 23, which terminates at the housing 51. The passageway 23 is linked to passageway 513 in the housing 51. Like the passageway 511, the passageway 513 extends through the housing 51, as shown in FIG. 10. The air or fluid travels through the passageways 23 and 513 to a retraction cavity 57 between the housing 51 and the movable housing 55. Seals 514 and 551 are provided to seal the retraction cavity 57 to prevent the escape of air/fluid. As the air/fluid enters the retraction cavity 57, the movable housing 55 and the retraction coupling assembly 54 are moved away from the extension 3 on the live tool 2 to disengage the extension 3 on the live tool 2. When the retraction coupling assembly 54 is in a retracted position, as shown in FIG. 10, the live tool 2 is no longer operatively coupled to the live tool drive shaft 14. In this position, the tool turret 30 can be indexed to another location.

An end of the live tool drive shaft 14 and the bevel gear 141 extend into a cavity 31 in the tool turret 30, as shown in FIGS. 1 and 10. One or more live tools 2 and stationary tools 1 are located about the periphery of the tool turret 30. The tool turret 30 includes a cover plate 34, which covers the cavity 31. Removal of the cover plate 32 provides access to the cavity 31 and the retractable linking mechanism 50 located therein. The housing 51 has a male key machined into its mounting surface. The hub 20 has a complimentary key way. The backlash between the gears 141 and 53 is adjusted by moving the retractable linking mechanism 50 up and down along the key way before tightening the linking mechanism 50 in place.

The indexing assembly 40 will now be described in greater detail. The indexing assembly 40 includes an indexing housing 41 that is secured to the housing 11. A coupling member housing 42 is secured to the indexing housing 41. The tool turret 30 is secured to an indexing shaft 44 using appropriate fasteners. The indexing shaft 44 is rotatably mounted on the hub 20 by bearing assemblies 441. The bearing assemblies 441 are preferably needle bearings. It is contemplated, however, that other bearing assemblies or other suitable lubricants may be used to ensure the smooth rotation of the indexing shaft 44 about the hub 20. A sealing arrangement 442 is provided at one end of the indexing shaft 44 to provide a seal between the indexing shaft 44 and the hub 20. Although the sealing arrangement 442 is located within a recess in the indexing shaft 44, it is contemplated that the sealing arrangement 442 may be located on the hub 20. The bearing assemblies 441 are held in place by retainer rings 443.

Figure 2:
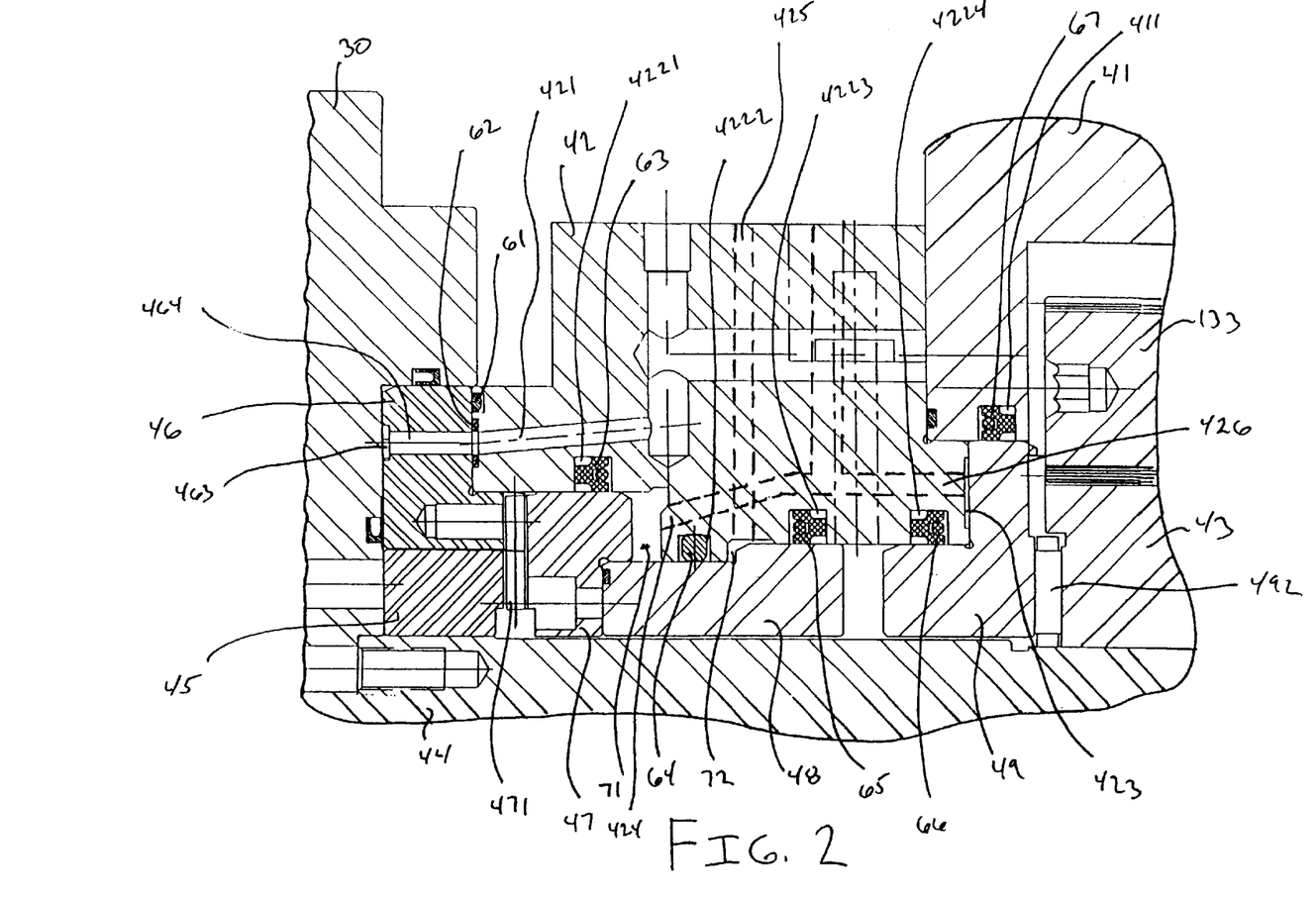
FIG. 2 is an enlarged cross-sectional view of the turret indexing system of FIG. 1 in an engaged position such that the orientation of the tool turret assembly is fixed.
Figure 3:
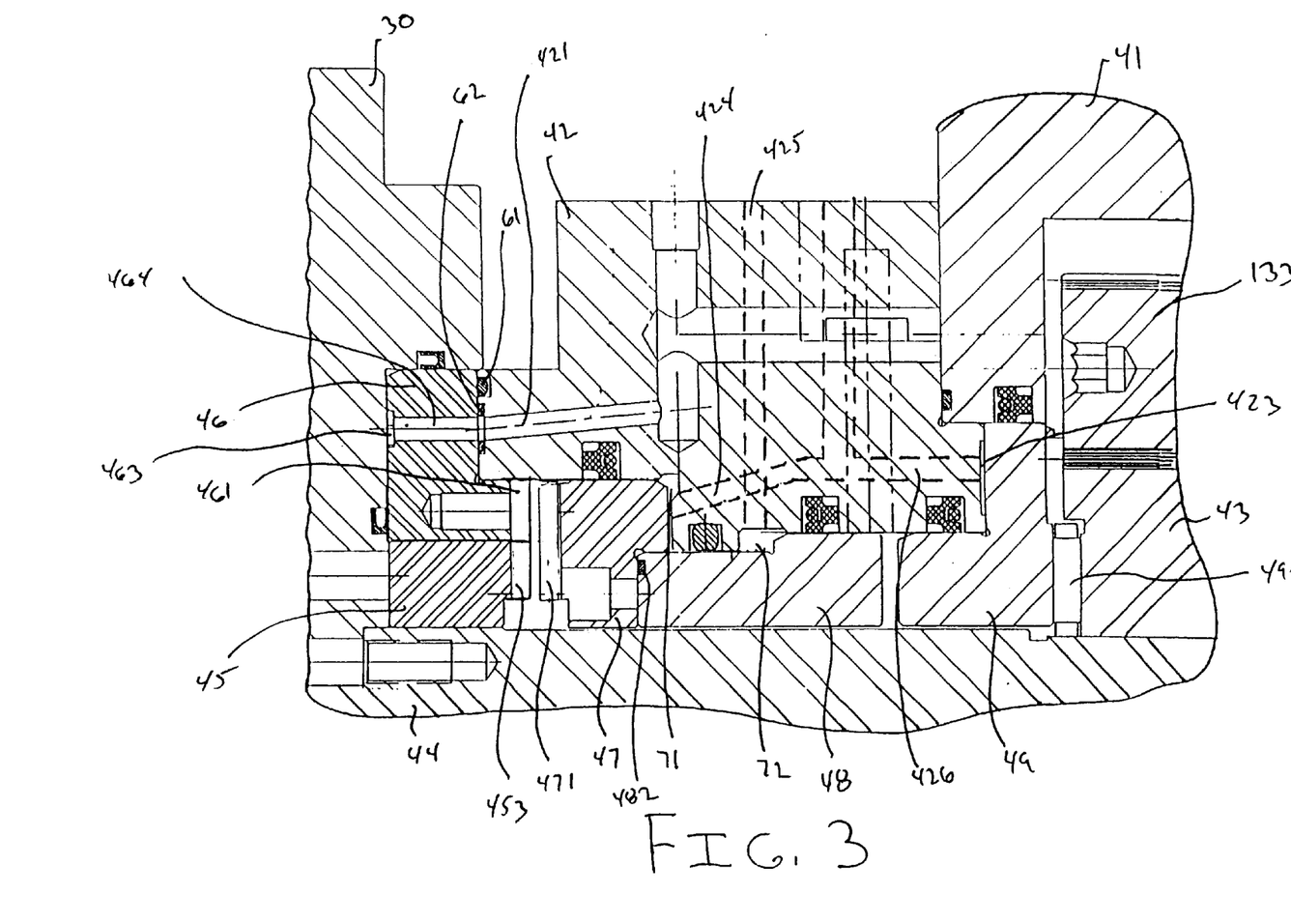
FIG. 3 is an enlarged cross-sectional view of the turret indexing system of FIG. 1 in a disengaged position such that the orientation of the tool turret assembly may be adjusted.

An opposite end of the indexing shaft 44 is secured to the indexing gear 43 using appropriate fasteners. As discussed above, the indexing gear 43 is operatively connected to the turret indexing shaft 13. As such, the tool turret 30 is linked to the turret indexing shaft 13 through the indexing gear 43 and the indexing shaft 44 such that the tool turret 30 will rotate in response to rotation of the turret indexing shaft 13. A rotating coupling member 45 is secured to one or more of the tool turret 30 and indexing shaft 44 and is capable of rotating therewith in response to rotation of the turret indexing shaft 13, as shown in FIGS. 2 and 3.

Figure 5:
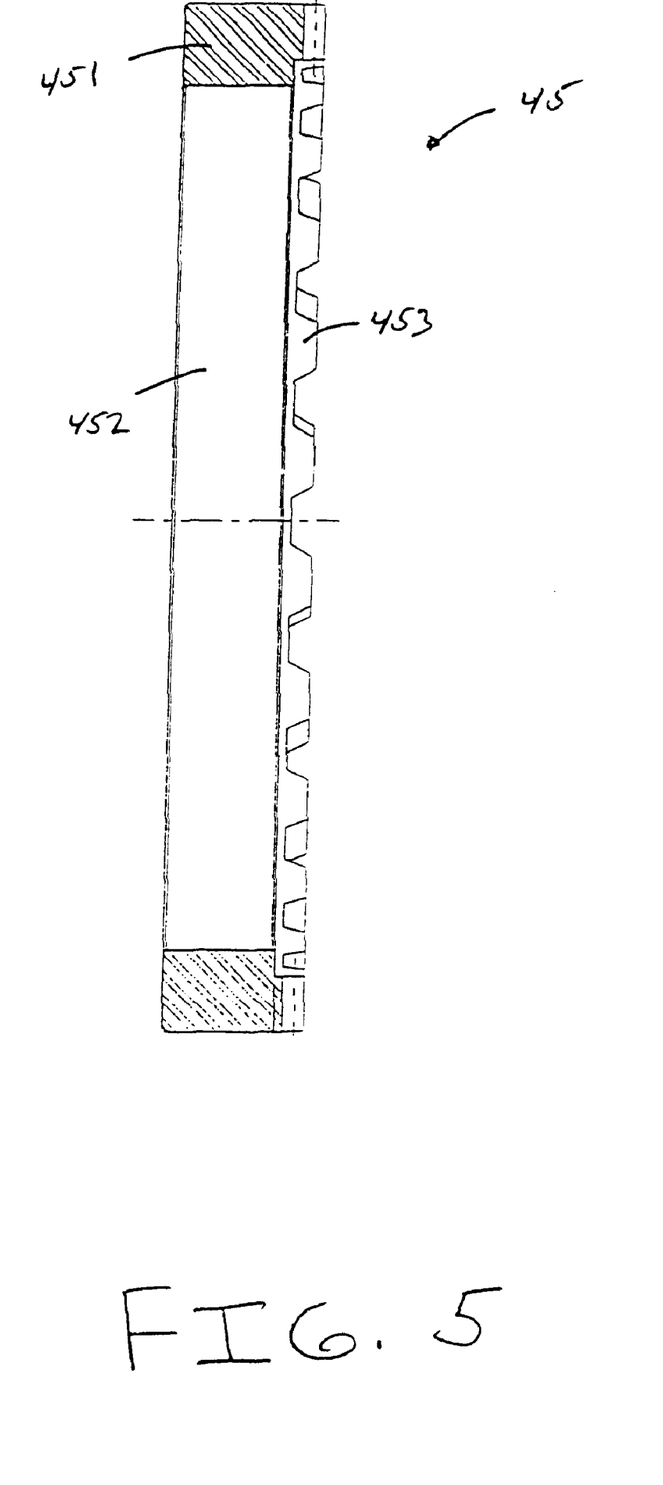
FIG. 5 is an enlarged cross sectional view of a rotatable coupling member of the turret indexing assembly in accordance with the present invention.

The rotating coupling member 45 includes a generally cylindrical ring 451 having a central passageway 452 through which the indexing shaft 44 extends. One end of the ring 451 includes a plurality of radial teeth 453 extending about the outer periphery thereof, as shown in FIG. 5.

Figure 6:
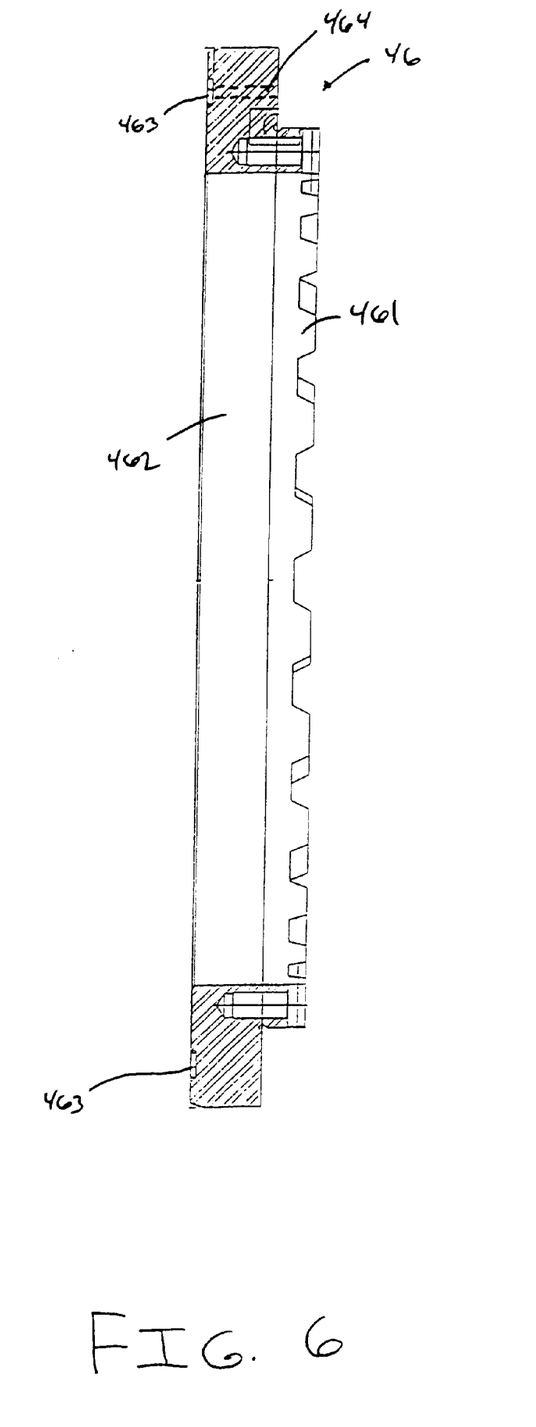
FIG. 6 is an enlarged cross sectional view of a fixed coupling member of the turret indexing assembly in accordance with the present invention.

A fixed coupling member 46 extends about the periphery of the rotating coupling member 45, as shown in FIG. 1. The fixed coupling member 46 is secured to the coupling member housing 42. The coupling member housing 42 includes a sealing assembly 61 extending about its periphery to provide a seal between the housing 42 and the fixed coupling member 46. Unlike the rotating coupling member 45, the fixed coupling member 46 does not rotate in response to rotation of the turret indexing shaft 13. The fixed coupling member 46 includes a plurality of radial teeth 461 that extend about the periphery of the central passageway 462, as shown in FIG. 6. The rotating coupling member 45 is rotatably received within the central passageway 462. The same number of teeth 453 and 461 are provided on the rotating coupling member 45 and the fixed coupling member 46 such that the teeth 453 can be radially aligned with the teeth 461. The teeth 461 of the fixed coupling member 46 extend into a central passageway 422 in the coupling member housing 42, as shown in FIGS. 1–3.

The fixed coupling member 46 further includes an annular groove 463 extending about a side of the member 46 that faces the tool turret 30, as shown in FIG. 6. At least one passageway 464 extends through the fixed coupling member 46 to the annular groove 463. The passageway 464 is operatively connected to a passageway 421 in the coupling member housing 42. A sealing assembly 62 may be provided on one of the coupling member housing 42 and the fixed coupling member 46 to provide a seal between the passageways 421 and 464, as shown in FIGS. 2 and 3. A supply of pressurized air is provided through the passageways 421 and 464 to the annular groove 463 at predetermined times (e.g., a turret indexing operation). The supply of air provides a cushion of air or air bearing between the fixed coupling member 46 and the tool turret 30. This arrangement reduces frictional forces between the fixed coupling member 46 and the tool turret 30 during a turret indexing operation. As discussed above in connection with the prior art, these frictional forces may result in increased torsional resistance, which can lead to damage to the machine tool and down-time. The operation of the air bearing in addition to variations will be discussed in greater detail below.

Figure 7:
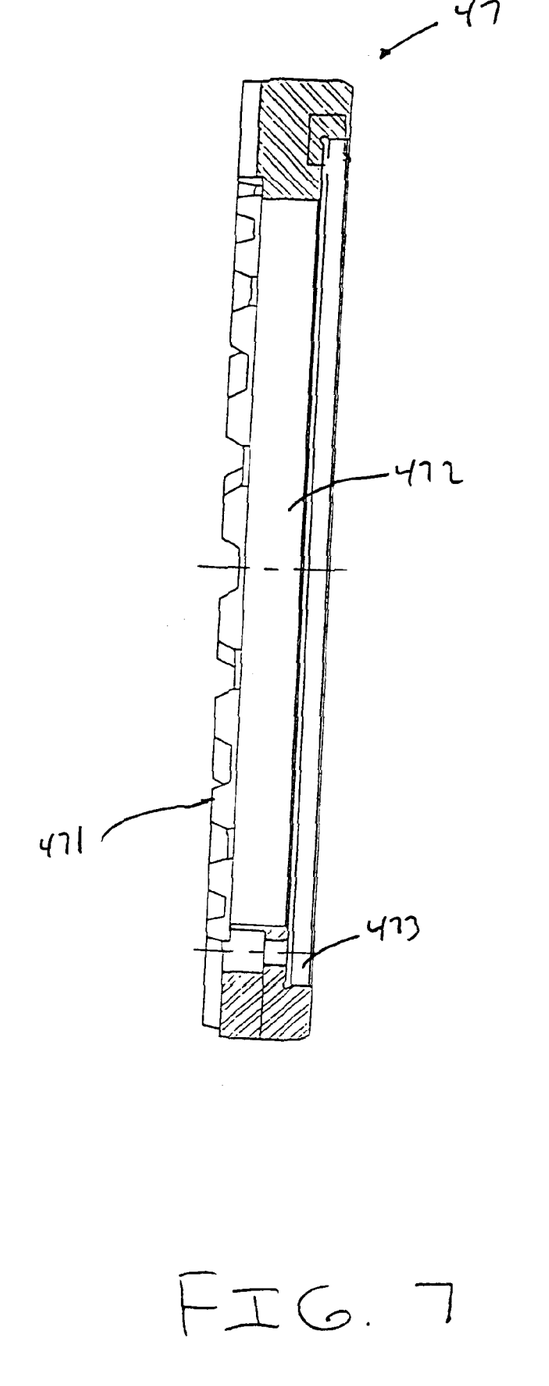
FIG. 7 is an enlarged cross sectional view of a movable coupling member of the turret indexing assembly in accordance with the present invention.

The teeth 453 of the rotatable coupling member 45 and the teeth 461 of the fixed coupling member 46 are adapted to mate with complementary radial teeth 471 on a movable coupling member 47. As shown in FIG. 7, a plurality of teeth 471 extend about the periphery on one end of the coupling member 47. The teeth 471 are adapted to mate with both the teeth 453 and the teeth 461 such that the coupling member 47 prevents rotation of the rotatable coupling member 45 with respect to the fixed coupling member 46 when the teeth 453, 461 and 471 are engaged. The coupling member 47 includes a central passageway 472 through which the indexing shaft 44 extends. The coupling member 47 is adapted to slide along the indexing shaft 44. The movable coupling member 47 is slidably received within the central passageway 422 of the coupling member housing 42 adjacent the teeth 461. The coupling member housing 42 includes a sealing assembly 63 located within an annular recess 4221 in the central passageway 422. The sealing assembly 63 provides a seal between the movable coupling member 47 and the housing 42, as the member 47 slides within the housing 42.

Figure 8:
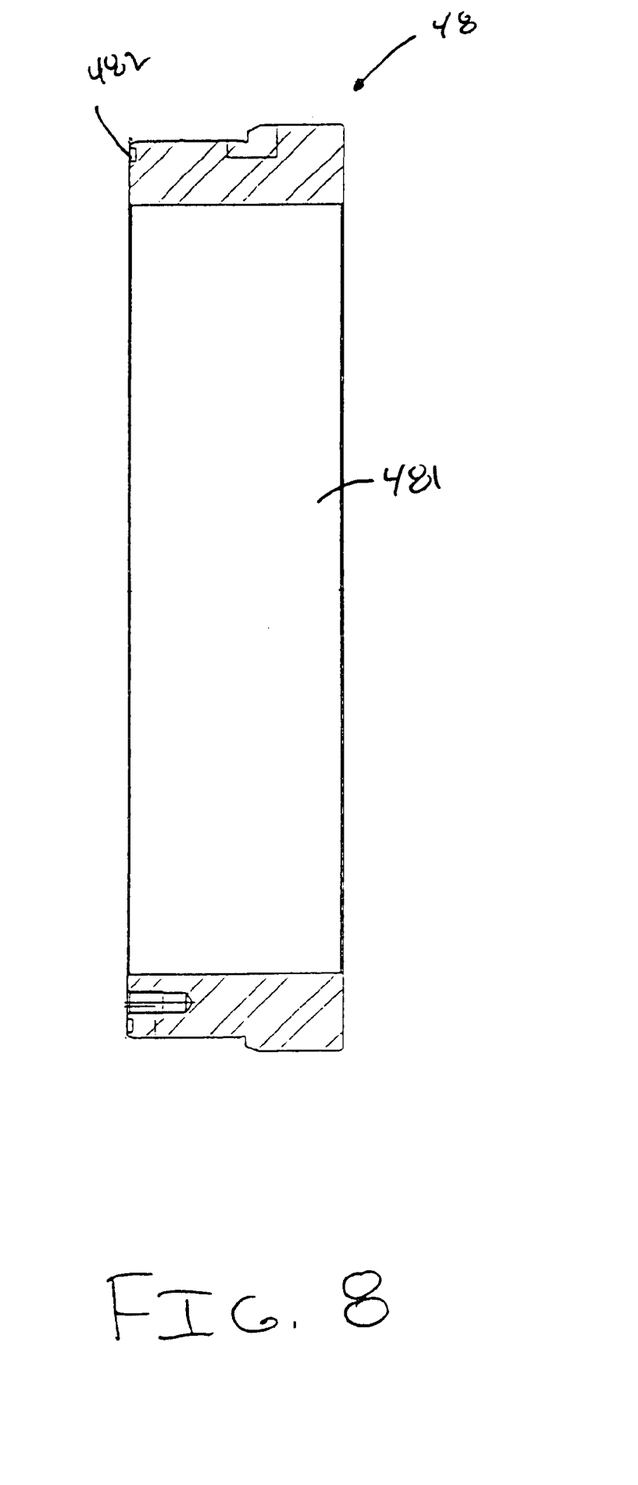
FIG. 8 is an enlarged cross sectional view of a front coupling actuator piston assembly of the turret indexing assembly in accordance with the present invention.

An end of the coupling member 47 opposite the teeth 471 includes a recess 473 that is adapted to receive a portion of the front actuator piston assembly 48. The coupling member 47 is secured to the front actuator piston assembly 48. An annular sealing assembly 482 provides a seal between the coupling member 47 and the piston assembly 48. As shown in FIG. 8, the front piston assembly 48 includes a central passageway 481 through which the indexing shaft 44 extends. The front piston assembly 48 is adapted to slide along the indexing shaft 44. Like the movable coupling member 47, the front piston assembly 48 is slidably received within the central passageway 422 of the coupling member housing 42. The coupling member housing 42 includes a sealing assembly 64 located within an annular recess 4222 in the central passageway 422. The coupling member housing 42 further includes a sealing assembly 65 located within an annular recess 4223 in the central passageway 422. The sealing assemblies 64 and 65 provide a seal between the front piston assembly 48 and the housing 42, as the assembly 48 slides within the housing 42.

Figure 9:
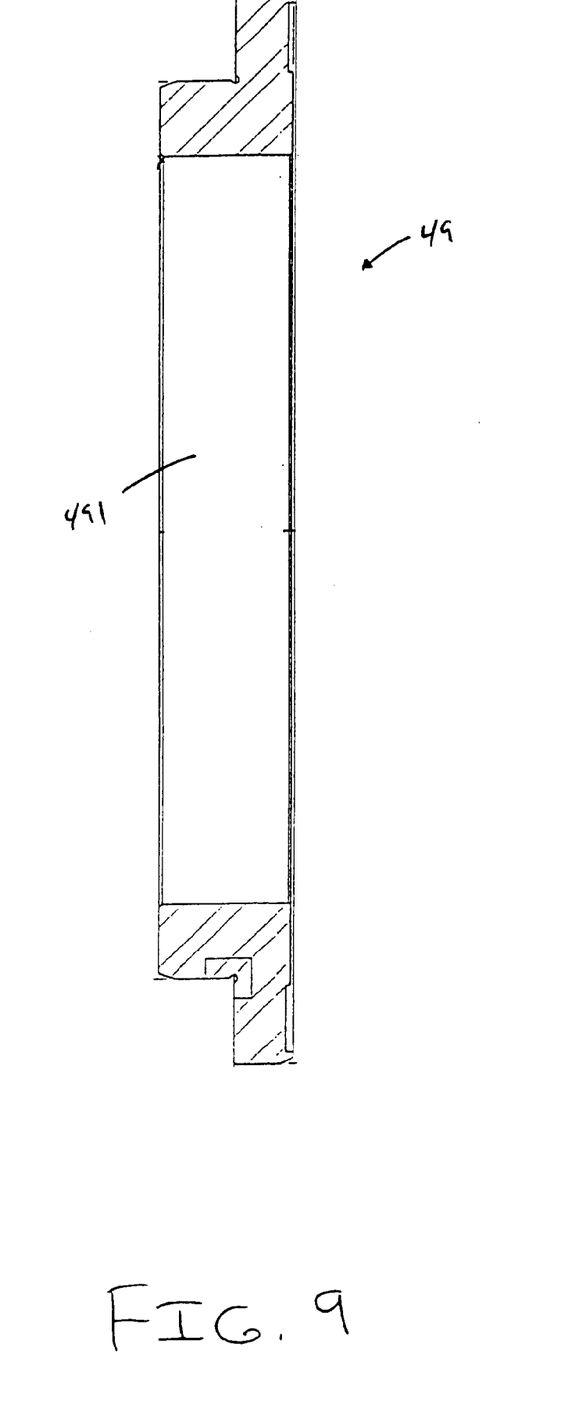
FIG. 9 is an enlarged cross sectional view of a rear coupling actuator piston assembly of the turret indexing assembly in accordance with the present invention.

A rear actuator piston assembly 49 is spaced from the front piston assembly 48. Like the front piston assembly 48, the rear piston assembly 49 includes a central passageway 491 through which the indexing shaft 44 extends, as shown in FIG. 9. The rear piston assembly 49 is adapted to slide along the indexing shaft 44. It should be noted, however, the travel of the rear piston assembly 49 is very limited, as will become apparent below. A first portion of the rear piston assembly 49, as shown in FIGS. 1–3, is received within the central passageway 422 of the coupling member housing 42. The coupling member housing 42 includes a sealing assembly 66 located within an annular recess 4224 in the central passageway 422. The sealing assembly 66 provides a seal between the rear piston assembly 49 and the housing 42, as the rear piston assembly 49 slides within the housing 42. A second portion of the rear piston assembly 49 extends over an annular recess 423 in the housing 42, as shown in FIGS. 2 and 3.

The second portion of the rear piston assembly 49 is slidably received within the indexing housing 41. The indexing housing 41 includes a sealing assembly 67 located within an annular recess 411. The sealing assembly 67 provides a seal between the rear piston assembly 49 and the housing 41, as the rear assembly 49 slides within the housing 41. A bearing assembly 492 is provided between the rear piston assembly 49 and the indexing gear 43. The bearing assembly 492 may include a thrust or radial needle bearing.

The coupling member housing 42 includes several passageways that supply either air or hydraulic fluid to perform the coupling and uncoupling of the coupling members 45, 46 and 47 during the turret indexing operation. As discussed above, the housing 42 includes a passageway 421 for supplying air to the fixed coupling member 46 to form an air cushion or air bearing between the turret 30 and the fixed coupling member 46. The housing 42, movable coupling member 46 and front piston assembly 47 collectively form an engaging cavity 71, as shown in FIGS. 2 and 3. A supply passageway 424 supplies hydraulic fluid to the engaging cavity 71. The housing 42 and the front piston assembly 47 collectively form a disengaging cavity 72. A supply passageway 425 supplies hydraulic fluid to the disengaging cavity 72. A supply passageway 426 in the housing 42 supplies hydraulic fluid to the annular recess 423 in the housing 42. It is contemplated that the supply passageway 424 and 426 may be operatively connected to a single hydraulic supply. The supply passageways 424, 425 and 426 are selectively connectable to pressurized hydraulic fluid supplies 82 and 83, shown in FIG. 4. Valve assemblies operated by the control assembly 15 are provided to selectively supply hydraulic fluid to the passageways 424, 425, and 426. Similarly, the passageway 421 is operatively connected to a pressurized air supply 81, shown in FIG. 4. A valve assembly operated by the control assembly 15 selectively supplies air to the passageway 421.

The indexing operation of the tool turret 30 will now be described. At the completion of a machining operation, the control assembly 15 deactivates the power supply 122. The tool drive shaft 14 ceases rotation. The live tool 2 is no longer operational. The control unit 15 activates a supply of air or hydraulic fluid through passageway 23 and passageway 513 to the retraction cavity 57. As a result, the movable housing 55 and the retraction coupling assembly 54 disengages the extension 3 on the live tool 2. When retracted, the retraction coupling assembly 54 will not hamper the indexing of the turret 30. The tool turret 30 may now be indexed to a new position.

The control assembly 15 activates the necessary valve assembly to deactivate the supply of hydraulic fluid through supply passageway 424 to the engaging cavity 71. The control assembly 15 also activates the necessary valve assembly to deactivate the supply of hydraulic fluid through supply passageway 426 to the annular recess 423. At the same time, the control assembly 15 activates the necessary valve assembly to activate the supply of hydraulic fluid through passageway 425 to the disengaging cavity 72. This results in a reduction in volume of the engaging cavity 71 and an increase in volume in the disengaging cavity 72. The fluid in cavity 71 drains through the passageway 424 as the cavity 72 expands. The movable coupling member 47 and the front piston assembly 48 move from the position, shown in FIG. 2, to the position, shown in FIG. 3. When this occurs, the teeth 471 disengage the teeth 453 and 461. The rotatable coupling member 45 is now free to rotate with respect to the fixed coupling member 46.

During this operation, the control assembly 15 activates the supply of pressurized air or fluid to supply the same through the passageways 421 and 464 to the annular groove 463. The pressurized air provides a cushion or air bearing between the turret 30 and the fixed coupling member 46, thereby slightly lifting the turret 30 with respect to the fixed coupling member 46. This reduces friction between these components during the indexing operation. Furthermore, the positive pressure differential between the area between turret 30 and the fixed coupling member 46 when compared to the area outside of the turret 30 also serves to prevent contaminants from entering between the turret 30 and member 46, which helps prevent damage to the turret 30 to reduce downtime.

During both the indexing operation and the machining operation, there is a small amount of possible axial movement of the turret 30 with respect to the housing 11 due to clearances between the parts. This axial movement can be magnified as strong forces are applied to the turret during clamping and/or machining that drive lubricating oil from between adjacent components. Therefore, it is important to control this movement during these operations. During the indexing operation, the use of the air cushion bearing places the axial clearance between the coupling member 46 and the turret 30, thereby reducing and/or preventing rubbing and increased wear between these components. The control of the axial movement of the turret 30 during the clamping and machining operation will be described below.

The turret indexing shaft 13 may now be driven by the power supply 121. The rotation of the turret indexing shaft 13 is transferred to the turret 30 through the indexing gear 43 and the indexing shaft 44. The turret 30 is rotated such that another live tool 2 or stationary tool 1 is advanced to a desired operating position.

The rotation of the turret indexing shaft 13 is stopped when the turret 30 has been indexed to the new desired position. At this time, the supply of air to the groove 463 is terminated. The tool turret 30 no longer rotates with respect to the fixed coupling member 46, as such the air bearing is no needed. Similarly, the supply of hydraulic fluid to the disengaging cavity 72 is terminated. The supply of hydraulic fluid to the engaging cavity 71 is reactivated. This results in a reduction in volume of the disengaging cavity 72 and an increase in volume in the engaging cavity 71. The fluid in cavity 72 drains through passageway 425 as the cavity 71 expands. The movable coupling member 47 and the front piston assembly 48 move the position, shown in FIG. 3, back to the position, shown in FIG. 2. When this occurs, the teeth 471 engage the teeth 453 and 461. The rotatable coupling member 45 is no longer free to rotate with respect to the fixed coupling member 46. Furthermore, the turret 30 is prevented from rotating about hub 20. The supply of hydraulic fluid to the annular groove 423 is also reactivated. The supply of fluid to the annular groove 423 biases the rear piston assembly 49 against the indexing gear 43. The force applied to the indexing gear 43 by the rear piston assembly 49 removes the axial clearance between the turret 30 and the fixed coupling member 46 and provides a strong retaining force on the turret 30 through the indexing shaft 44 to prevent the teeth 453 and 461 from separating from the teeth 471. This prevents lifting of the turret 30 during a machining operation (e.g., cutting), thereby minimizing the effect of bending forces imparted on the turret 30. This ensures proper alignment of the turret 30 during the machining operation. Furthermore, the area of groove 423 is greater than the cavity 71 such that the retaining force created by the supply of fluid to the groove 423 is greater than any pushing force on the movable coupling member 47 that might again introduce clearance between the turret 30 and fixed coupling member 46. It is contemplated that the supply of fluid to the cavity 71 and the groove 423 occurs simultaneously. The present invention, however, is not limited to a simultaneous supply. It is contemplated the supply may be first directed to the groove 423 or in the alternative to the cavity 71.

The frictional forces that exist between the turret 30 and the fixed coupling member 46 when in the clamped mode further assist in maintaining the orientation of the turret 30 during a machining operation.

If a live tool 2 is to be used, the retractable linking mechanism 50 is operated to link the live tool 2 to the live tool drive shaft 14. A supply of air or hydraulic fluid is provided through passageway 22, which expands the extension cavity 56 such that the movable housing 55 moves the retraction coupling assembly 54 into engagement with the extension 3 on the live tool 2. If a stationary tool 1 is to be used, the supply of fluid to the retraction cavity 57 is maintained.

While this invention has been described in connection with what is presently considered to be the most practical and preferred embodiment, it is to be understood that it is capable of further modifications and is not to be limited to the disclosed embodiment. For example, it is contemplated that the turret indexing mechanism disclosed herein may be adapted for use with the tool turret described in U.S. Provisional Patent Application No. 60/99,295, filed Sep. 4, 1998, entitled "Indexing Tool Turret" and copending U.S. patent application Ser. No. 09/389,051, filed Sep. 2, 1999, entitled "Indexing Tool Turret." These applications are assigned to the assignee of the present application and are incorporated herein specifically by reference.

It is also contemplated that the turret indexing mechanism disclosed herein may be adapted for use with the driving arrangement and sealing arrangement described in copending U.S. patent application Ser. No. 09/630,556, filed Aug. 2, 2000, now abandoned entitled "Driving Connection Arrangement and Sealing Arrangement for a Live Tool and Method for Sealing the Same." This application is assigned to the assignee of the present application and is incorporated herein specifically by reference.

Figure 11:
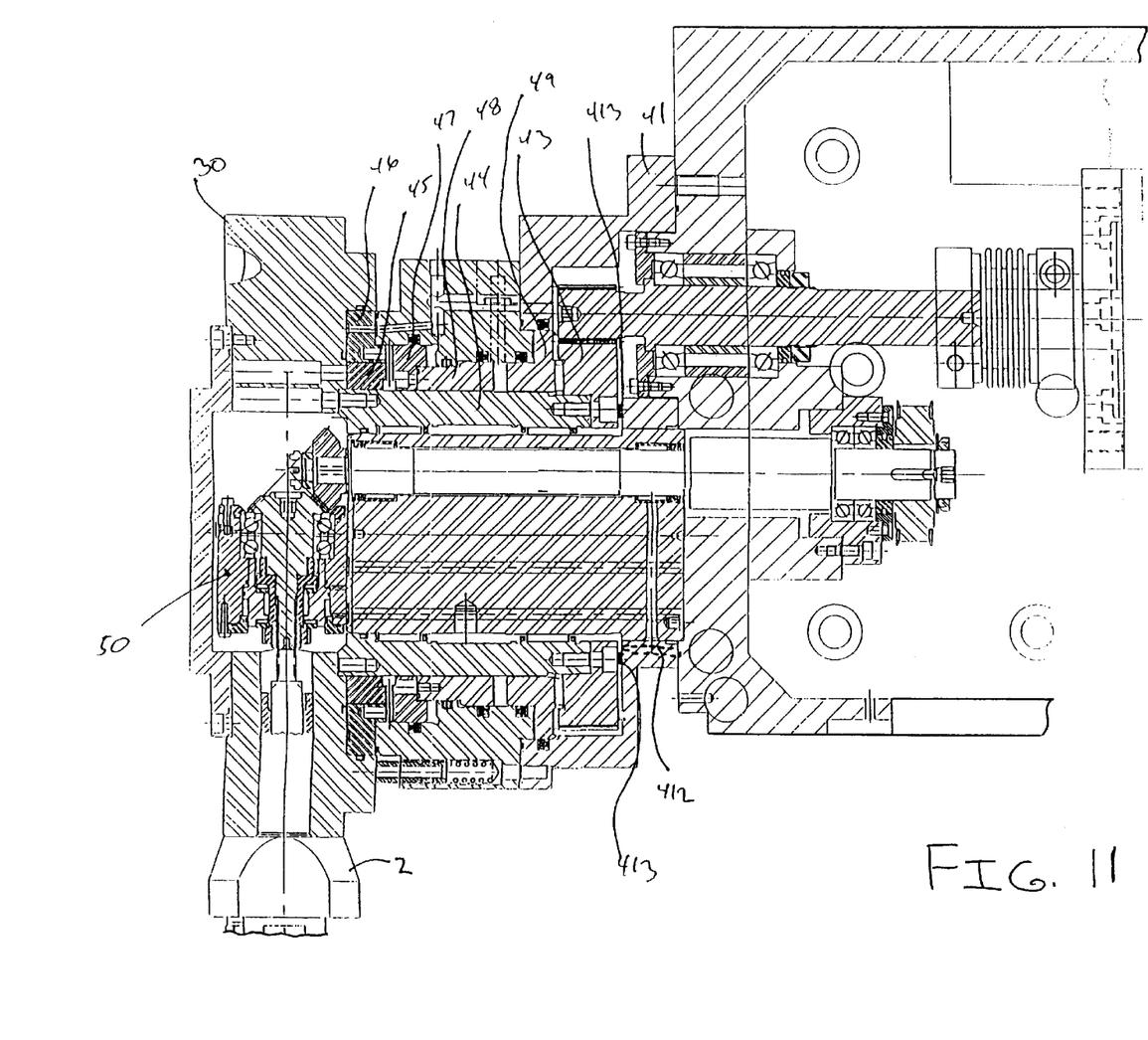
FIG. 11 is a cross sectional view of a machine tool having a turret indexing system according to another embodiment of the present invention.

Furthermore, different locations of the air bearing, described above, are contemplated. For example, a suitable air bearing may be provided between the housing 41 and the indexing gear 43, as shown in FIG. 11. A supply passageway 412 is provided in the housing 41. The passageway 412 is connected to a suitable air or fluid supply, not shown. A sealing assembly 413 is provided between the indexing gear 43 and the housing 41. The control assembly 15 controls the supply of air/fluid to operate the air cushion bearing. With this arrangement, the indexing gear 43 is moved slightly toward the housing 42. This movement is transferred to the tool turret 30 through the indexing shaft 44. This results in an increase in clearance between the fixed coupling member 46 and the turret 30.

It is also contemplated that the hydraulic systems described above may be replaced with a suitable electromagnetic system that would move the teeth 471 of the movable coupling member 47 into and out of engagement with the teeth 453 and 461.

It is further contemplated that a supply of either hydraulic fluid or air may be supplied between the piston assemblies 48 and 49 when the teeth 471 are engaged with teeth 453 and 461. With this arrangement, the piston assembly 49 would exert additional force on the gear 43. The piston assembly 48 would exert additional force on the coupling members.

This application is intended to cover any variations, uses, equivalent arrangements or adaptations of the invention following, in general, the principles of the invention and including such departures from the present disclosure as come within known or customary practice in the art to which the invention pertains, and as may be applied to the essential features herein before set forth and followed in the spirit and scope of the appended claims and their equivalents.

What is claimed is:

1. An indexing tool turret assembly for a machine tool, comprising:
   a tool turret assembly rotatably supported on the machine tool, said tool turret assembly including at least one of a stationary tool assembly and a live tool assembly supported thereon;
   an indexing assembly for selectively rotating said tool turret assembly to a desired location, wherein said indexing assembly includes a locking assembly to prevent rotation of said tool turret assembly during operation of said at least one of a stationary tool assembly and a live tool assembly, said locking assembly including a rotating portion and a fixed portion, said rotating and fixed portions having respective teeth, said locking assembly further including a moveable coupling member that engages the teeth of said rotating and fixed portions to lock the position of the turret assembly and that disengages the teeth to enable indexing of the turret assembly;
   a control assembly for controlling the operation of said indexing assembly; and
   a fluid bearing assembly for selectively separating said tool turret assembly from said locking assembly while said indexing assembly selectively rotates said tool turret assembly to a desired location.

2. The indexing tool turret assembly according to claim 1, wherein said bearing assembly comprises a supply of air to selectively separate said tool turret assembly from said locking assembly.

3. The indexing tool turret assembly according to claim 2, wherein said supply of air is provided between said tool turret assembly and said locking assembly wherein said supply of air forms a cushion of air between said tool turret assembly and said locking assembly.

4. The indexing tool turret assembly according to claim 2, wherein said control assembly controls said supply of air to selectively separate said tool turret assembly from said locking assembly.

5. An indexing tool turret for a machine tool, comprising:
   a tool turret assembly rotatably supported on the machine tool, said tool turret assembly including at least one of a stationary tool assembly and a live tool assembly supported thereon;
   an indexing assembly capable of rotating said tool turret assembly to a desired location; and
   a lock that locks the location of the turret assembly at the desired location, comprising:
      a rotating portion constructed and arranged to rotate with the tool turret assembly;
      a fixed portion; and
      a moveable coupling that is moveable between (1) a first position in which the moveable coupling member operationally engages the fixed portion and the rotating portion, thereby preventing rotation of the tool turret assembly, and (2) a second position in which the moveable coupling is operationally disengaged from the fixed and the rotating portions, thereby allowing the tool turret assembly to rotate;
   wherein the fixed and rotating portions have respective pluralities of teeth constructed and arranged to engage a corresponding plurality of teeth on the moveable coupling when the moveable coupling is in the first position;

and further comprising a fluid bearing assembly constructed and arranged to selectively separate rotating portions of the tool turret assembly from the fixed coupling member when the moveable coupling member is in the second position.

6. The tool turret assembly of claim 5, wherein the indexing assembly includes an indexing shaft.

7. The tool turret assembly of claim 6, wherein the rotating portion is a generally cylindrical ring.

8. The tool turret assembly of claim 7, wherein the fixed portion extends about the periphery of the rotating portion.

9. The tool turret assembly of claim 5, wherein the fluid bearing assembly is an air bearing assembly.

10. A method of indexing a rotatable tool turret assembly of a machine tool to rotate the tool turret assembly to a desired location such that a tool located on the tool turret assembly can perform a machining operation on a workpiece, the tool turret assembly being connected to a locking assembly, the method comprising:

disengaging teeth of a coupling portion of a lock on the turret assembly from teeth of fixed and rotating portions of the lock;

separating the tool turret assembly from the locking assembly using a fluid bearing;

rotating the tool turret assembly with an indexing assembly; and engaging the coupling portion of the lock with the fixed and rotating portions; and reconnecting the tool turret assembly to the locking assembly.

11. The method of claim 10, wherein the fluid bearing is an air bearing.

* * * * *